United States Patent [19]

Nola

[11] Patent Number: 4,649,287

[45] Date of Patent: Mar. 10, 1987

[54] BIDIRECTIONAL CONTROL SYSTEM FOR ENERGY FLOW IN SOLAR POWERED FLYWHEEL

[75] Inventor: Frank J. Nola, Huntsville, Ala.

[73] Assignee: The United States of America as represented by the Administrator of the National Aeronautics and Space Administration, Washington, D.C.

[21] Appl. No.: 636,459

[22] Filed: Jul. 31, 1984

[51] Int. Cl.$^4$ ............................................. H02P 13/18
[52] U.S. Cl. ........................................ 307/31; 307/131;
307/64; 307/66; 307/80; 318/107; 318/161;
318/150; 290/1 R; 320/5; 136/293
[58] Field of Search ...................... 307/131, 64, 80, 87,
307/31, 66; 318/161, 376, 327, 145, 146, 147,
150, 152, 107; 136/291, 292, 293; 320/39, 5;
244/53 R, 58, 173; 323/284, 283, 285, 351, 906;
290/1 A; 315/303, 306, 307, 311, 360

[56] References Cited

U.S. PATENT DOCUMENTS

| | | | |
|---|---|---|---|
| 3,667,012 | 5/1972 | Kilgore | 318/161 |
| 3,778,312 | 12/1973 | Sikarius | 244/173 X |
| 3,947,738 | 3/1976 | Oliver | 318/599 |
| 4,079,591 | 3/1978 | Derby et al. | 290/1 R |
| 4,131,827 | 12/1978 | Larrabee | 318/107 X |
| 4,144,551 | 3/1979 | Smith et al. | 307/31 X |
| 4,146,828 | 3/1979 | Ross et al. | 318/599 |
| 4,188,666 | 2/1980 | Legrand et al. | 244/173 X |
| 4,280,328 | 7/1981 | Falconer | 290/1 R X |
| 4,300,081 | 11/1981 | Van Landingham | 318/599 |
| 4,358,719 | 11/1982 | Currier et al. | 318/161 |
| 4,368,415 | 1/1983 | Henderson et al. | 244/173 X |
| 4,375,662 | 3/1983 | Baker | 323/906 X |
| 4,390,940 | 6/1983 | Corbefin et al. | 323/906 X |
| 4,412,170 | 10/1983 | Roesel, Jr. | 307/64 X |
| 4,468,569 | 8/1984 | Norris | 290/1 R |
| 4,495,451 | 1/1985 | Barnard | 318/161 X |

Primary Examiner—William M. Shoop, Jr.
Assistant Examiner—Shik Luen Paul Ip
Attorney, Agent, or Firm—Joseph H. Beumer; John R. Manning; Leon D. Wofford, Jr.

[57] ABSTRACT

An energy storage system for a spacecraft is provided which employs a solar powered flywheel arrangement including a motor-generator which, in different operating modes, drives the flywheel and is driven thereby. A control circuit, including a threshold comparator, senses the output of a solar energy converter, and when a threshold voltage is exceeded thereby indicating the availability of solar power for the spacecraft loads, activates a speed control loop including the motor-generator so as to accelerate the flywheel to a constant speed and thereby store mechanical energy, while also supplying energy from the solar converter to the loads. Under circumstances where solar energy is not available and thus the threshold voltage is not exceeded, the control circuit deactivates the speed control loop and activates a voltage control loop that provides for operation of the motor as a generator so that mechanical energy from the flywheel is converted into electrical energy for supply to the spacecraft loads.

6 Claims, 6 Drawing Figures

BIDIRECTIONAL CONTROL SYSTEM FOR ENERGY FLOW IN SOLAR POWERED FLYWHEEL

ORIGIN OF THE INVENTION

The invention described herein was made by an employee of the United States Government and may be manufactured and used by or for the Government for Government purposes without the payment of any royalties thereon or therefor.

FIELD OF THE INVENTION

The present invention relates to flywheel systems and more particularly, to a control system for a solar powered flywheel employed as an electrical power source for a spacecraft.

BACKGROUND OF THE INVENTION

Orbital space stations presently in the planning stage require an electrical power source with a lifetime of 20 years or more. A high-ranking candidate system having an outstanding weight to energy storage ratio is the flywheel. In addition to energy storage, a flywheel can also be adapted to provide the further function of a control moment gyroscope for maneuvering the spacecraft.

Many different flywheel systems have been devised for energy storage purposes. Similarly, there many other energy storage systems which utilize solar energy.

Some examples of energy storage systems of possible interest are discussed in the following U.S. Pat. Nos. 3,667,012 (Kilgore); 4,131,827 (Larrabee); 4,177,793 (Schultz); 4,204,147 (Larrabee); 4,212,287 (Dougherty et al); 4,314,198 (Rogers); 4,321,478 (Plunkett et al); 4,333,136 (Baker); and 4,412,170 (Roesel, Jr.). The Baker patent discloses a control unit for controlling the power supplied by photo-voltaic solar panel source to a load. Power is coupled to the load or cut off therefrom in response to the panel voltage being greater or less than a predetermined level. The Larrabee patents both disclose power transfer systems which control the power transferred between a solar cell array and a load. In the later patent, a parameter indicative of the power being delivered to the load is sensed and an impedance matching system is adjusted accordingly. In the earlier patent, a DC motor and an AC induction motor are operated in tandem such that the DC motor, which is powered from the solar cell array, acts to reduce the loading on the AC motor. The Dougherty et al patent discloses an isolation integrator wherein a control signal related to the rate of isolation is integrated to determine whether the signal is adequate for operation of a solar collection system. The Schultz patent discloses a solar heating system incorporating a device providing electrical control signal responsive to the rate of flow of "species of radiant energy" through an area. The Rogers patent discloses a solar source for a lighting system which automatically connects and disconnects the lighting system to and from a rechargeable power source. The Plunkett et al patent discloses an auxiliary power supply including a synchronous machine for storing kinetic energy when the load current load does not exceed the normal steady magnitude thereof and for converting kinetic energy into electrical energy to supply the load current requirement in excess of that magnitude. The Kilgore patent discloses a system including a wound rotor and a flywheel provided on a shaft and wherein a cycloconverter is used to provide speed control of the motor. The Roesel Jr. patent discloses a motor-generator system for providing prolonged uninterrupted power to a load.

SUMMARY OF THE INVENTION

In accordance with the present invention bi-directional control of energy flow is provided in a solar powered flywheel-type energy storage arrangement for a spacecraft. The basic components of the overall system are the flywheel, a solar energy converter, a motor and an electronic control circuit or controller, with the primary power source being the Sun. Generally speaking, when the spacecraft is in sunlight, solar energy is used to accelerate the flywheel and to power the spacecraft. This is referred to hereinbelow as the energy storage mode, with energy being supplied to the flywheel for storage thereby. When the spacecraft on the dark side of the Earth and thus solar energy is not available, the flywheel takes over and energy is supplied therefrom to the spacecraft, this being the regenerative mode of operation of the system of the invention.

The system of the present invention possesses a number of important features and advantages. For example, the presence (or absence) of sufficient solar energy is sensed by simply detecting a threshold. Further, if solar energy is present, the control circuit activates a speed control loop which, as noted above, accelerates the flywheel, thereby converting electrical energy to stored mechanical energy, with a speed sensing feedback arrangement being provided for maintaining the speed of the flywheel constant in the event that excess solar energy is not available. In addition, if sufficient solar energy is not available, the control circuit deactivates the speed control loop and activates a voltage control loop for controlling the amount of mechanical energy from the flywheel that is converted into electrical energy and supplied to the spacecraft loads. The latter is accomplished by using a error voltage, corresponding to the difference between the commanded reference voltage and the load voltage, to vary the widths of the pulses produced by a pulse width modulator drive circuit for controlling the motor-generator.

These, and other features and advantages of the invention, are described in more detail in the description of the preferred embodiments of the invention which follows.

DESCRIPTION OF THE PREFERRED EMBODIMENTS

Figure 1:
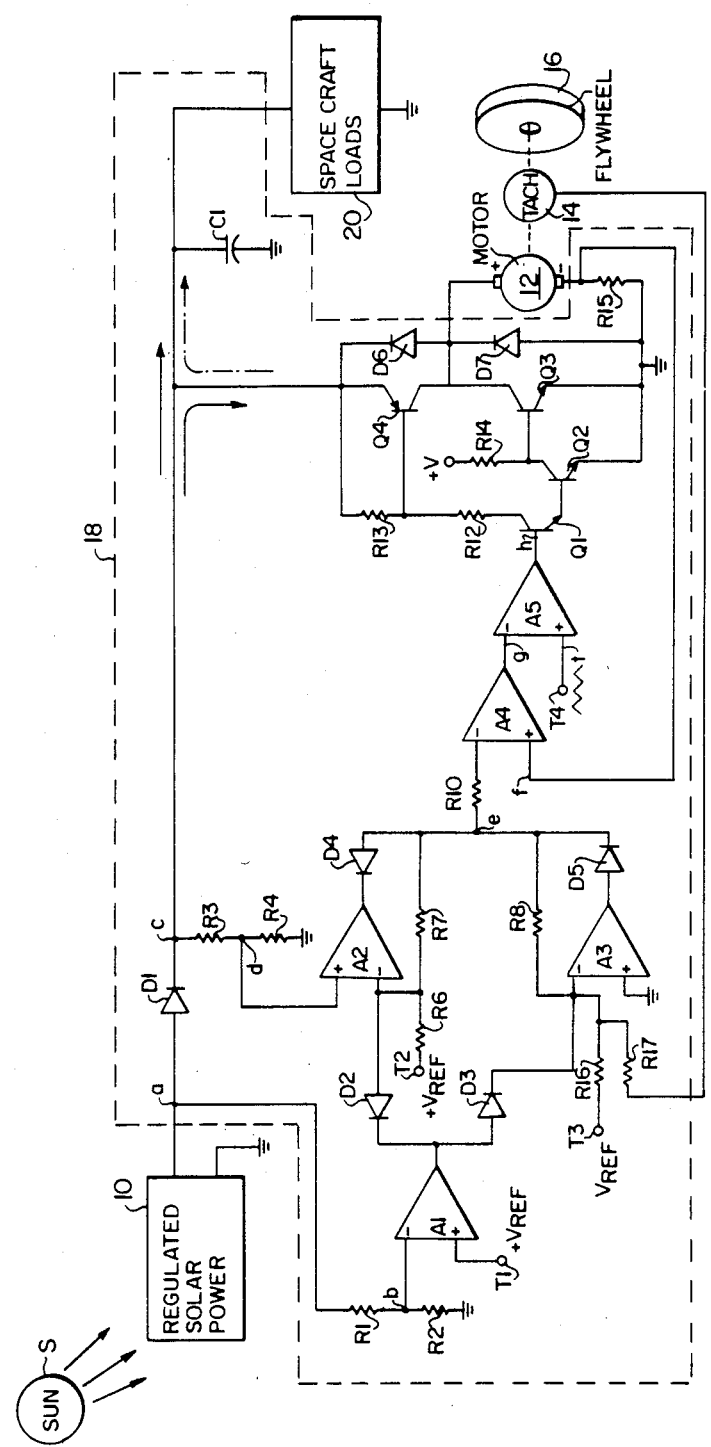
FIG. 1 is schematic circuit diagram of the solar powered flywheel system of the invention.

Referring to FIG. 1, the basic units or components of the spacecraft electrical power source of the invention are a conventional regulated solar power source, denoted 10; an electric motor 12; a tachometer sensor 14 for sensing the motor output; a conventional flywheel 16 driven by motor 12; and a control circuit or electronic controller 18 which is connected to the spacecraft load or loads, denoted 20. In general, the primary power source of the system is the Sun (indicated at S)

and when the spacecraft is in sunlight, solar energy extracted by regulated solar power source 10 is used to supply the system power for accelerating the flywheel 16 and for the other spacecraft loads 20 as indicated by the solid line arrows in FIG. 1. On the dark side of the Earth, where solar energy is not available, the flywheel 16 takes command and supplies energy to the spacecraft loads 20, as indicated by the chain line arrow in FIG. 1.

Before proceeding with a more detailed consideration of the electronic controller 18, it is noted that while motor 12 is shown and described as being a brush type DC motor, the present invention is equally applicable to a brushless motor. Further, acceleration and regenerative control modes for brushless motors are described by the applicant in U.S. Pat. No. 3,860,858 (Nola) and in Nasa Publication NASA TM X-33972, entitled "Traction Drive System Considerations for Lunar Roving Vehicles".

Controller 18 includes an input terminal "a" connected to solar power unit 10 and, in turn, connected through a diode D1 to a junction point "c" and through a resistor R1 to a junction point "b" between resistor R1 and a further resistor R2 which forms a voltage divider with resistor R1. Point "b" is connected to one input of a first operational amplifier A1 which acts as a comparator and receives a reference voltage "vref" from a reference terminal T1 at the other (positive) input. The output of operational amplifier A1 is connected through a diode D2 to one input of a second operational amplifier A2 and through a further diode D3 to one input of a third operational amplifier A3.

The second (positive) input of operational amplifier A2 is connected to the juntion point "d" between a pair of resistors R3 and R4, resistor R3 being connected to junction point "c" described above. The output of operational amplifier A2 is connected through a diode D4 to a junction point "e" connected through a resistor R10 to one input of a further operational amplifier A4. A feedback resistor R7 is connected between diode D4 and the negative input of operational amplifier A2 while a further resistor R6 is connected between that input and a further reference voltage terminal T2 providing the positive reference voltage "Vref".

The output of operational amplifier A3 is connected through a diode D5 to junction point "e". A further reference terminal T3 is connected through a resistor R16 to a junction between a resistor R17 connected to tachometer 14 and a resistor R8 which is also connected to junction point "e".

The output of operational amplifier A4 is indicated at "g" and is connected to the negative input of a further operational amplifier A5. The second (positive) input to operational amplifier A4, which is denoted "f", is connected to a junction between motor 12 and a resistor R15 while the second input to operational amplifier A5 is denoted "t" and is a triangular waveform as shown at input terminal T4. The output "h" of operational amplifier A5 is connected to the base of a first transistor Q1 whose emitter is connected to the base of a second transistor Q2. The collector of transistor Q2 is connected to the base of a third transistor Q3, with the emitters of transistors Q2 and Q3 being connected to ground. The collector of transistor Q2 is also connected to a reference voltage through a resistor R14 while the collector of transistor Q3 is connected to the collector of a fourth transistor Q4 and to the positive terminal of motor 12. The base of transistor Q4 is connected through a resistor R12 to the collector of transistor Q1 while a further resistor R13 is connected between the base of transistor Q4 and the emitter thereof. The latter is connected to a junction connected to junction "c" and to the spacecraft loads 20. A shunt capacitor C1 is connected in parallel with loads 20 and diodes D6 and D7 are connected across transistors Q4 and Q3, respectively.

Considering the operation of the system in FIG. 1, the availability of solar energy is determined by the voltage level output of the regulated solar power source 10 at point "a". If solar energy is available, the voltage at point "a" will be above a given threshold. If there is insufficient solar energy to supply the spacecraft load 20, the voltage at "a" will drop below the threshold. This threshold voltage is sensed and divided down by the voltage divider formed resistors R1 and R2 to a level at point "b" which is compatible with the input of comparator A1.

Considering the different modes of operation provided by the system of the invention, it will be assumed first that solar power is available. The values of resistors R1 and R2 are selected such that the voltage at point "b", which is the input voltage at the inverting (minus) input of comparator A1, is greater than the positive voltage "Vref" at the non-inverting (plus) input. This causes the output of comparator A1 to be hard negative and this negative voltage is passed by diode D2 to the minus or negative input of operational amplifier A2. This negative voltage is greater than the plus voltage "Vref" supplied at terminal T2 through resistor R6 and drives the output of operational amplifier A2 full positive. This output voltage is blocked by diode D4, thereby rendering operational amplifier A2 ineffective when solar power is available.

Further, the negative output of comparator A1 is blocked by diode D3 so that comparator A1 has no effect on the operation of operational amplifier A3. Under this circumstance operational amplifier A3 is active. The reference voltage "Vref" at terminal T3 is applied through R16 to the negative or minus input of operational amplifier A3 causing the output thereof to go positive. The positive output of operational amplifiers A3 is passed by diode D5 through resistor R10 to the negative or minus input of operational amplifier A4. As described later in more detail, a positive input voltage on resistor R10 will cause current to flow from the solar power source 10 into the motor 12 to accelerate the flywheel 16. The speed of motor 12 is sensed by tachometer 14 whose voltage is fed back through resistor R17 to satisfy the speed commanded by the reference voltage "Vref" at terminal T3. Resistor R8 serves to establish loop gain.

Thus, in summary, when solar energy is available, the operation of comparator A1 as a threshold detector places the system in an acceleration and speed control mode for storing energy. The speed feedback from tachometer 14 maintains the flywheel 16 at a fixed maximum speed in the event that an excess of solar energy is available.

Considering the operation of the system when the spacecraft enters the dark side of the Earth, the solar power source 10 will not be able to maintain the regulated output thereof under these conditions and the voltage at point "a" will drop. This is sensed by comparator A1 and when the voltage at "b" is less than the positive reference voltage "Vref" the output of comparator A1 will switch to a full positive output. This positive voltage is passed by diode D3 to the minus input of operational amplifier A3, thereby causing the output thereof to switch full negative. This negative output is blocked by diode D5 so that operational amplifier A3 has no effect on the operation of the remainder of control circuit. The positive output of comparator A1 is blocked by diode D2 there rendering comparator A1 ineffective with respect to operational amplifier A2. Under this circumstance, operational amplifier A2 is active. The reference voltage "Vref" is fed through resistor R6 to the minus input of operational amplifier A2 thereby causing the output thereof to go negative. This output is passed by diode D4 through resistor R10 to the minus input of operational amplifier A4. As explained later in more detail, a minus input voltage at resistor R10 will cause current to flow from the motor 12, which now acts as a generator, to the spacecraft load 20. The spacecraft load voltage at point "c" is sensed by the voltage divider formed by resistors R3 and R4 at point "d" which is fed back to the positive or plus input of operational amplifier A2. This feedback provides precise regulation of the spacecraft load voltage as the load changes and as the motor speed changes. This operation is also described later in more detail.

Figure 3A:
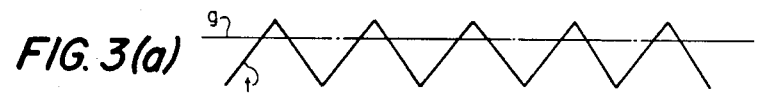
FIGS. 3(a) and to 3(d) are waveforms used in explanation of the operation of the system of the invention.
Figure 3B:

The motor controller of the invention uses pulse width modulation (PWM) for high efficiency and to implement the regenerative operation of the motor 12. A triangular wave, shown in FIG. 3(a) and typically having a frequency of 10 kHz, is fed from terminal T4 to the positive or plus input "t" of comparator A5. The motor current is sensed by the voltage drop across resistor R15. This voltage is fed back to point "f", i.e., to the plus input of operational amplifier A4. The output of the latter, indicated at "g", is the current error voltage which corresponds to the difference between the commanded current at point "e" and the feedback current at "f". The error voltage at "g" is fed to the minus input of operational amplifier A5. As shown in FIG. 3(a), the intersections of the error voltage at "g" and the triangular wave at "t" cause comparator A5 to change states. When the ramp or triangular wave at "t" is greater than the voltage at "g", the output of comparator A5, indicated at "h", is positive as shown in FIG. 3(b). The width of this positive output pulse increases as the error voltage signal (at "g") intersects the triangular wave (at "t") at a lower potential.

Figure 3C:

All of the transistors Q1 to Q4 will be switched either full off or full on. When the voltage at "h" is positive, transistors Q1 and Q2 are switched on. Under these circumstances, transistor Q2 pulls the base of transistor Q3 lower than the turn on threshold thereof thereby causing transistor Q3 to be turned off. Base current from transistor Q4 flows through limiting resistor R12 and transistor Q1 so as to turn transistor Q4 on. During this "on" interval, current flows from the power source 10, through transistor Q4, the motor 12, and resistor R15 back to the return line of the source 10. The corresponding waveform is shown in FIG. 3(c).

Figure 2:
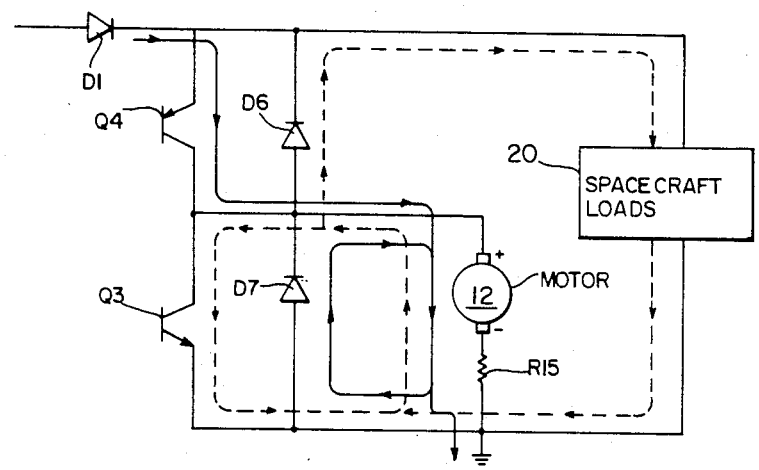
FIG. 2 is detail of a portion of FIG. 1 showing the current paths for two different modes of operation.
Figure 3D:

FIG. 2 is detail of a portion of FIG. 1 used in explanation of the operation of the system and the current flow path just described is indicated in solid line arrow in FIG. 2. The motor 12 has inductance and thus will store energy equal to $\frac{1}{2} LI^2$ where L is the motor inductance and I is the motor current. When the output of amplifier A5 switches negative the transistors Q1, Q2 and Q4 switch off. The inductive energy of the motor 12 causes the current to continue to flow during the entire off period, through the motor 12, resistor R15, and diode D7 as shown by solid line arrow in FIG. 2. While the supply current is pulsed, the motor current, and hence the voltage across resistor R15, is continuous as shown in FIG. 3(d).

The current just described is the accelerating current for the flywheel 16. Under stall conditions, the current in the motor 12 is exactly proportional to the pulse width. There is no energy being stored in the flywheel 16 under stall conditions and the feedback signal at point "f" will adjust the pulse width to supply only the power required (average line amps times line volts) in order to satisfy losses in the system. As the flywheel 16 begins to turn the motor 12 develops a back emf whose polarity opposes the supply voltage. This tends to cause a drop in the current. This drop in the current is sensed by resistor R15 and is fed back to high gain amplifier A4. The high gain of amplifier A4 forces the current to be exactly as commanded by input voltage "e" by lowering the output of amplifier A4 to intersect the ramp voltage (at "t") at a lower potential and thus increase the width of the resultant pulses. As the speed of the motor 12 increases, the pulse width increases so as to apply a voltage to the motor 10 which is greater than the back emf and to therefore force the current to a constant level or to a level as commanded by the voltage at point "e".

When the maximum speed set point is reached, as measured by the tachometer 14 and fed back to operational amplifier A3, the output of the operational amplifier A3 will decrease which thus lowers the current command signal at point "e". The voltage point "e" will adjust itself to command a current sufficient to overcome frictional losses and maintain the speed of the flywheel 16 constant. The signal level at point g, which corresponds to the command current at point "e" minus the feedback current at "f", will adjust itself to intersect the ramp voltage at terminal T4 at a level which will provide a pulse width sufficient to supply voltage to the motor 12 slightly greater than the back emf. This difference in voltage, divided by the motor resistance, is equal to the current being commanded at point "e". This completes the description of the accelerating or energy storage mode of operation of the system of FIG. 1.

In the regenerative mode of operation, the voltage at point "e" becomes negative. This causes the output of operational amplifier A4 to intersect the ramp voltage (at "t") at a higher voltage, thereby causing a decrease in the width of the pulses and a decrease in the voltage applied to the motor 10. The applied voltage is now less than the back emf, meaning that there is negative current flow. To explain, when the output of operational amplifier A5 is negative, transistors Q1, Q2, and Q4 are all off. Transistor Q3 is on during this time interval by virtue of the base current flowing from the +V terminal through limiting resistor R14. This provides a current path for the back emf potential through the motor 12, transistor Q3, and resistor R15 as indicated by the dotted line arrow in FIG. 2. When transistor Q3 switches off, inductive energy stored in the motor 12 forces the current to continue to flow during the entire off interval through the path provided by the motor 12, diode D6, the spacecraft load 20 and resistor R15. In this mode, the voltage across resistor R15 is of the opposite polarity to that when the system was in the accelerating mode. This is consistent with the negative potential being applied at point "e" and represents negative current feedback.

If an increase in spacecraft load 20 causes the voltage to drop, the voltage at point "d" in FIG. 1, i.e, at the junction of resistors R3 and R4 will also drop, thereby causing the output of operational amplifier A2 to go further negative. This commands a greater negative motor current to supply the increase in spacecraft load 20. A negative input to operational amplifier A4 causes the output thereof to go more positive and thus this output intersects the ramp voltage (at "t") at a higher potential so as to increase the "on" time of transistor Q3 and thus supply the increase in current. Similarly, as the flywheel 16 slows down, the back emf will decrease, thereby tending to decrease the spacecraft voltage. The feedback will increase the "on" time of transistor A3 as the back emf decreases to maintain the spacecraft voltage constant.

Capacitor C1 is used to filter the line voltage during the regenerative cycle. The operational amplifier A1 contains hystersis to insure that slight changes in the voltage at point "a" which may result at load transfer do not interfere with its operation.

Although the invention has been described relative to exemplary embodiments thereof, it will be understood by those skilled in the art that variations and modifications can be effected in these exemplary embodiments without departing from the scope and spirit of the invention.

I claim:

1. An energy supply system for a spacecraft for supplying energy to at least one spacecraft load, said system comprising:
   a flywheel;
   an electric motor connected to said flywheel for selectively supplying electrical power to the spacecraft load;
   solar energy conversion means for receiving solar energy and for converting the received solar energy into an output voltage for supply to the spacecraft load; and
   electrical control means for (1) sensing the spacecraft load voltage, and feeding back the sensed voltage to regulate the voltage supplied to the spacecraft load when the spacecraft load voltage changes, and for (2) comparing the output voltage from said solar energy conversion means with a threshold voltage and, when said threshold voltage is exceeded, activating a speed control loop including said motor so as to accelerate the flywheel to a constant speed to thereby convert the electrical energy supplied from said solar energy conversion means into mechanical energy, and, when said threshold voltage is not exceeded, deactivating said speed control loop and activating a voltage control loop for controlling the amount of mechanical energy from said flywheel which is converted into an electrical energy output from said motor for supply to the spacecraft load in according with the sensed load voltage.

2. An energy supply system as claimed in claim 1 further comprising speed sensing means for sensing the output speed of said motor and for feeding back a signal in accordance with the sensed output speed to the electrical control means so as to maintain the said output speed at a fixed maximum when an excess of solar energy is available.

3. An energy supply system as claimed in claim 1 wherein said control means includes pulse width modulation means for supplying control pulses to said electric motor.

4. An energy supply system for a spacecraft for supplying electrical energy to at least one spacecraft load, said system comprising:
   a flywheel;
   an electric motor-generator, connected to the flywheel for, during a first mode of operation as generator, selectively supplying electrical power to the spacecraft load and for, during a second mode of operation as a motor, selectively providing acceleration of said flywheel;
   solar energy conversion means for receiving solar energy and for converting the solar energy received thereby into a corresponding output voltage; and
   electrical control means including threshold comparator means for sensing the output voltage produced by said solar energy conversion means and for producing a first output when said output voltage exceeds a predetermined threshold and for producing a second output when said output voltage is less than said predetermined threshold, and a control circuit, responsive to the output said threshold comparator means, for, during an energy storage mode of operation, providing current flow from the solar energy conversion means to said spacecraft load and to said motor to accelerate said flywheel when said predetermined threshold is exceeded, and for, during a regenerative mode of operation, providing for operation of said motor as a generator so that current flows from the motor to spacecraft load; said electrical control means further comprising speed control feedback means for sensing the speed of rotation of the flywheel and for controlling the current flow to the motor such that a constant speed of rotation of said flywheel is maintained, and further feedback means for sensing the voltage associated with the spacecraft load and for regulating the voltage supplied to the spacecraft load accordingly.

5. A system as claimed in claim 4 wherein said control circuit includes a first operational amplifier having a first input for receiving a voltage which is a function of the output of said threshold comparator means and a second input for receiving a voltage which is a function of the motor voltage, and a second operational amplifier, having a first input connected to the output of the first operational amplifier and a second input which receives a periodic ramp voltage, for producing a pulse width modulated output for controlling the operation of said motor.

6. A system as claimed in claim 5 wherein said means for sensing the voltage associated with the spacecraft load includes a further operational amplifier having one input connected to receive said associated voltage and an output connected to the said one input of said first operational amplifier so that the width of the pulses of the pulse width modulated output of the second operational amplifier are controlled accordingly.

* * * * *